March 15, 1949.  H. C. WARNER  2,464,625
HOLDING DEVICE
Filed Dec. 30, 1944  2 Sheets-Sheet 1

INVENTOR.
Homer C. Warner
BY
Haywood and VanHorn
His Attorneys

March 15, 1949.  H. C. WARNER  2,464,625
HOLDING DEVICE

Filed Dec. 30, 1944  2 Sheets-Sheet 2

INVENTOR.
Homer C. Warner
BY
Hawgood and Van Horn
His Attorneys

Patented Mar. 15, 1949

2,464,625

UNITED STATES PATENT OFFICE 2,464,625

HOLDING DEVICE

Homer C. Warner, Cleveland, Ohio, assignor to The Lees-Bradner Company, Cleveland, Ohio, a corporation of Ohio Application December 30, 1944, Serial No. 570,695

2 Claims. (Cl. 279—57)

This invention relates to holding devices, particularly such devices as may be used in conjunction with machine tools and similar apparatus and which are used to retain a work piece or a tool, being generally known as chucks.

An object of the invention is to provide an improved holding device which will accurately locate an article held thereby.

Another object is to provide an improved holding device which may easily be applied to machines and tools of current types.

Another object is to provide an improved holding device in which the parts will be effectively protected.

Another object is to provide an improved holding device which may be operated with expenditure of relatively little force.

Another object is to provide an improved holding device which will be rigid and durable.

Another object is to provide an improved holding device which may be easily manufactured.

Another object is to provide an improved holding device which may be easily assembled and dis-assembled.

Other objects will hereinafter appear.

The invention will be better understood from the description of one practical embodiment thereof, illustrated in the accompanying drawing, in which.

Figure 1:
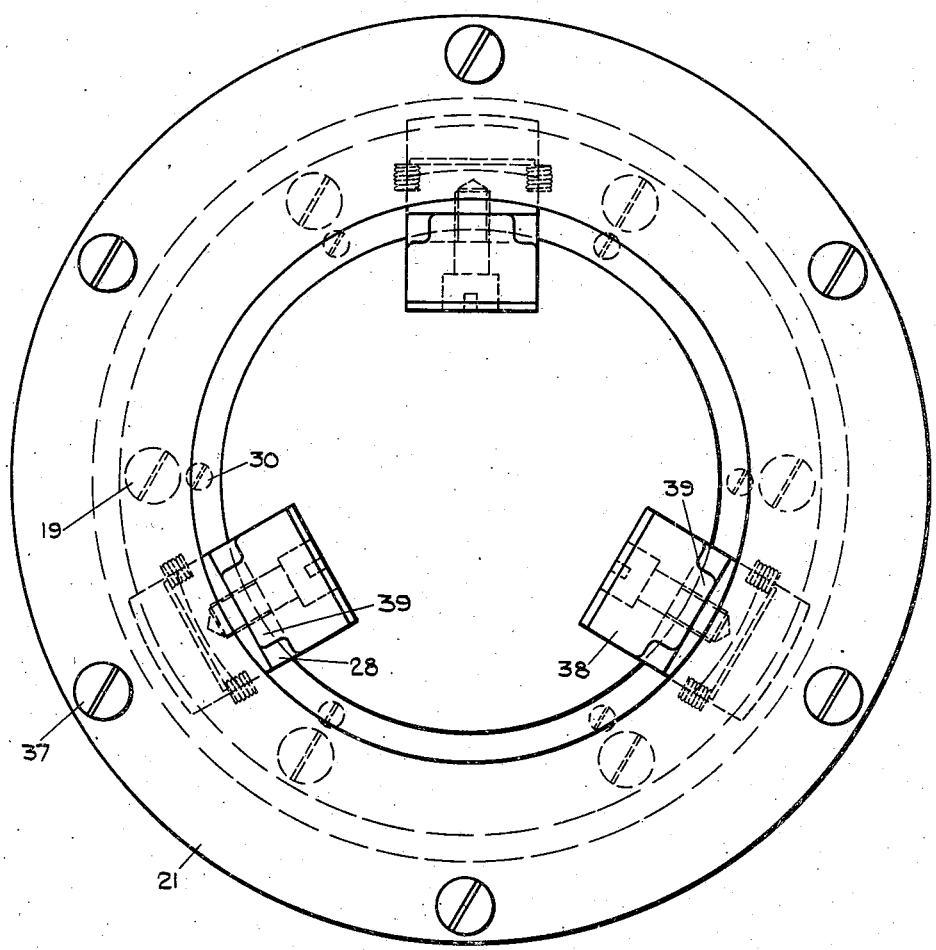
Figure 1 is an end elevational view of a chuck embodying the present invention.
Figure 3:
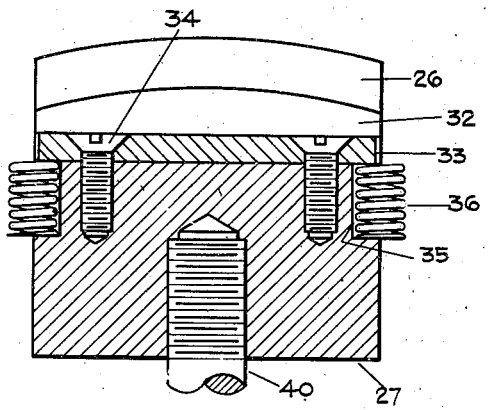
Figure 3 is a fragmentary cross-sectional view taken on the line III—III of Figure 2, to an enlarged scale.
Figure 2:
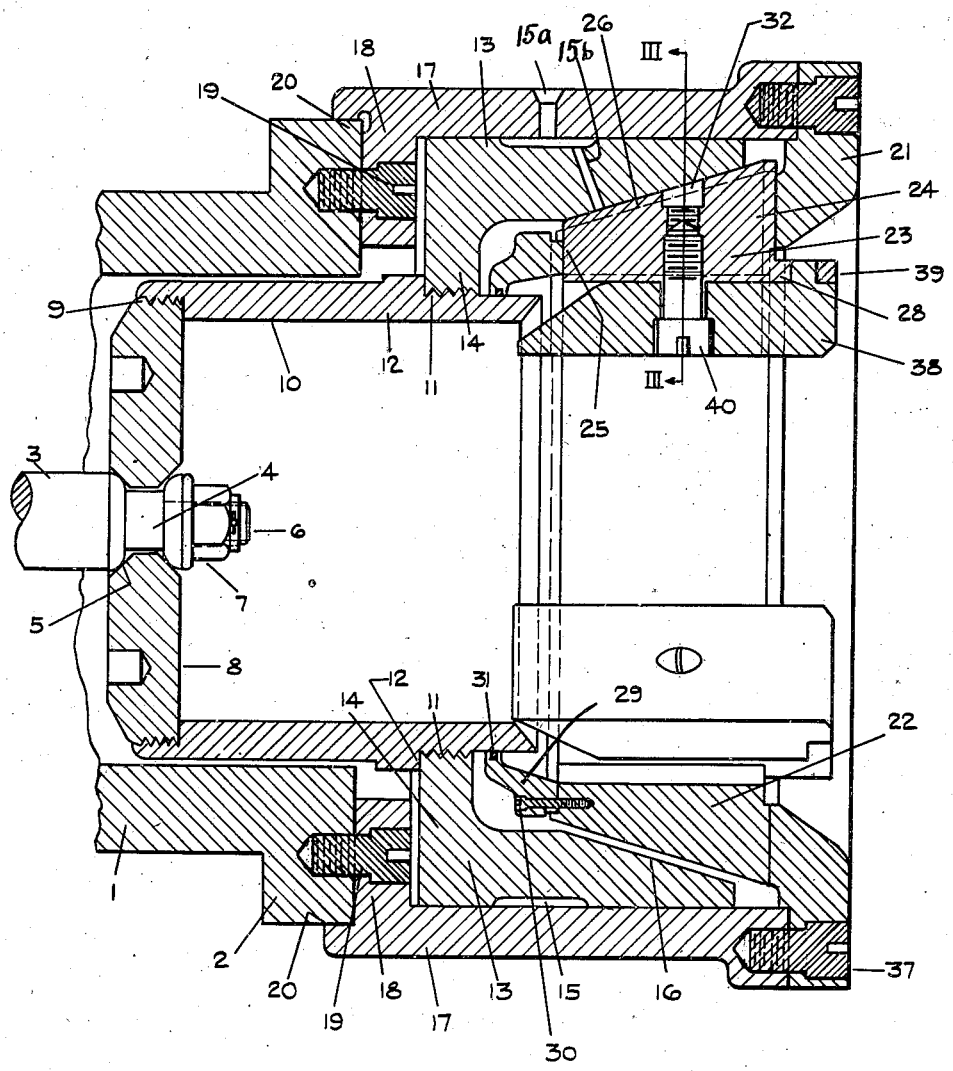
Figure 2 is a central sectional view thereof.

The chuck is shown as applied to a spindle of a machine tool such as a lathe, milling machine, hobbing machine or the like, the end of the machine spindle being indicated at 1 and terminating in an outwardly directed peripheral flange 2.

Within the hollow of the spindle is a chuck actuating mechanism including an axially positioned and movable rod 3 which may be a piston rod connected to a piston in an hydraulic cylinder, a pneumatically actuated rod, or may be actuated by mechanical or any other desired means, these being carried by or within the spindle 1 and positioned upon the end of the spindle remote from the flange 2.

The end of the actuating rod 3 is reduced as indicated at 4 providing a shoulder 5 and terminating in a threaded extension 6.

Threaded upon the extension 6 is a nut 7 which clamps, between it and the shoulder 5, a disc 7 having its outer edge threaded as indicated at 9 into a tubular sleeve 10.

Secured upon the exterior of the sleeve, as by being threaded thereto at 11 and abuttting the shoulder 12, is a cam member consisting of a cylindrical peripheral flange 13 and an inwardly extending flange 14.

The outer surface of the cylindrical flange is provided with an annular recess 15 to conduct lubricant, as will be hereinafter described, while the inner surface is cylindrical for a short extent adjacent the flange or head 14, but through the majority of the extent is conical as indicated at 16.

The outer cylindrical surface of flange 13 has a sliding seat within a cylindrical guide housing or cover 17, provided adjacent its inner end with a radially extending flange or head 18, which is secured to the flange 2 of the spindle by machine screws 19, and also by a recessed end 20 which receives the end of the flange 2 of the spindle.

An oil duct 15a extends through the housing 17, communicating with recess 15, and ducts 15b extend from the latter to the conical surface of flange 13 adjacent each jaw of the chuck.

Fixed to the front end of the cylindrical member 17 is a guide, retainer, or cover member shown as an inwardly directed peripheral ring or flange 21, and this carries an inwardly directed tubular spacer 22, the latter being substantially cylindrical on its inner surface and on its outer surface being shown as conical and of substantially the same taper as the surface 16, but spaced slightly therefrom in all positions of the parts.

Several radial slots are cut through the spacer flange 12, these being shown in the drawing as three in number, for the reception of the chuck jaws 23. These jaws each have a plane surface lying in a plane normal to the axis of the spindle and abutting a similar plane surface at the forward ends of the slots defined by ring 22. Each jaw has a parallel plane surface at its inner or reduced ends, as indicated at 25, and an outer conical surface 26 engaging the inner conical surface 16 of the cam member 13.

The inner surface 27 of each jaw is also shown as plane. Adjacent this surface the jaw extends, in a generally axially positioned flange 28, beyond its plane front surface 24, the flange being centrally notched for a purpose to be hereinafter described.

Holding the jaws with their surfaces 24 tightly in engagement with the corresponding surfaces of the ring 21 is a sealing ring 29, which is secured to the ring 23 by machine screws 30 and which carries a packing 31 fitting upon the cylindrical exterior surface of the sleeve 10 to prevent the entrance or exit of lubricant, chips, coolant, or other fluid or solid materials to or from the interior of the device. The ring 29 also acts as a second retainer, preventing the jaws from moving away from retainer 21 in a direction axial of the chuck.

Each jaw is provided with a central transverse notch 32 in which is positioned a retaining bar 33, held in place by machine screws 34, and semi-cylindrical notches 35 are formed under the ends of this bar, these being arranged to be brought into alignment with similar semi-cylindrical notches formed at the sides of the slots in ring 22.

Positioned in the cylindrical spaces formed by the aligned semi-cylindrical slots are springs 36 which bear at one end on the bars 33 and at the other on the ring 22 to urge the jaws constantly outwardly, against the conical surface 16 of the cam member.

The ring 21 is held to sleeve or housing 17 by machine screws 37.

In order to adapt the jaws to articles of different diameters, each may be provided with a false jaw 38. The false jaw has a lug 39 which enters the recess in flange 28 to hold the false jaw in alignment, and the false jaw is further located and held in place by one or more clamping machine screws 40, each having its head received in a counter-bored recess in the false jaw and being threaded into the jaw 23.

From the above, it will be seen that the jaws and the false jaws are both held from any axial movement and are permitted only a translating motion, directly radially in and out, as the cam member is reciprocated axially by its actuating rod 3.

The cam member presses the false jaws tightly upon the work, having a relatively long tapered surface and providing a wedging action distributed over the wide conical surface 26. This gives a large mechanical advantage and requires relatively little force on rod 3 to open or close the jaws.

The springs 36 promptly return the jaws to object-releasing position.

This limiting of the motion of the jaws to a purely radial movement, permits the much more accurate and convenient location of the work than has been the case where the jaws move axially as well as radially, while at the same time gaining the simplicity in operation and simultaneous movement of these jaws possible with a single actuating rod arranged along the axis of the spindle.

While I have described the illustrated embodiment of my invention in some particularity, obviously many other embodiments, variations, and modifications will readily occur to those skilled in this art, and I do not, therefore, limit myself to the precise details shown and described herein, but claim as my invention all embodiments, modifications and variations coming within the scope of the appended claims.

I claim:

1. A chuck comprising a housing having an annular recess, a retainer secured to the end of the housing and projecting into the recess and having a plane guide surface lying in a plane normal to the axis of the chuck, a second retainer secured to the first retainer and having a plane surface lying in another plane normal to the axis of the chuck, a plurality of jaws each having two parallel plane surfaces engaging the said surfaces of the two retainers, a hollow cylindrical actuator having actuator surfaces carried within the recess, a closed carrier supporting said cam, and packing between one of said retainers and the carrier, the housing, the carrier, packing and retainer enclosing the actuator and the outer portion of the jaws.

2. A chuck comprising a housing having an annular recess, a retainer secured to the end of the housing and projecting into the recess and having a plane guide surface lying in a plane normal to the axis of the chuck, a second retainer secured to the first retainer and having a plane surface lying in another plane normal to the axis of the chuck, a plurality of jaws each having two parallel plane surfaces engaging the said surfaces of the two retainers, a hollow cylindrical actuator having cam surfaces carried within the recess, a closed carrier supporting said actuator, packing between one of said retainers and the carrier, the housing, the carrier, packing and retainer enclosing the actuator and the outer portion of the jaws, and false jaws secured to each of said jaws.

HOMER C. WARNER.

REFERENCES CITED

The following references are of record in the file of this patent:

FOREIGN PATENTS

| Number | Country | Date |
|---|---|---|
| 564,389 | France | 1923 |
| 720,711 | France | 1931 |
| 841,617 | France | 1939 |